United States Patent [19]

Helgans, Jr.

[11] 3,996,794

[45] Dec. 14, 1976

[54] DIFFERENTIAL DEPTH INDICATOR

[75] Inventor: Robert E. Helgans, Jr., Chester, N.J.

[73] Assignee: The United States of America as represented by the Secretary of the Navy, Washington, D.C.

[22] Filed: Oct. 17, 1966

[21] Appl. No.: 588,270

[52] U.S. Cl. .................................. 73/170 A; 73/301
[51] Int. Cl.² ............................................. G01D 3/00
[58] Field of Search ................ 73/170 A, 301, 407; 340/7

[56] References Cited
UNITED STATES PATENTS

| | | | |
|---|---|---|---|
| 2,440,903 | 5/1948 | Massa | 340/7 UX |
| 3,080,655 | 3/1963 | Ailleret et al. | 73/170 O X |
| 3,250,123 | 5/1966 | Clayton | 73/301 |
| 3,299,399 | 1/1967 | Bowers | 73/301 X |

*Primary Examiner*—Jerry Myracle
*Attorney, Agent, or Firm*—R. Sciascia; R. Beers; S. Sheinbein

[57] ABSTRACT

A differential depth indicator for measuring the attitude of an underwater cable which is being laid. Pressure transmitting points are spaced in an array which attached to the cable being laid, and the pressure at each point is transmitted via fluid conduits to differential pressure transducers. The transducers give an electrical indication of the differential pressure which is sent to the surface where it may be visually displayed.

5 Claims, 2 Drawing Figures

INVENTOR
Robert E. Helgans Jr.

ATTORNEY

DIFFERENTIAL DEPTH INDICATOR

This invention relates to underwater cable laying and in particular is concerned with a system for obtaining information whereby the differential depth at spaced zones of an underwater cable may be indicated as the cable is being layed. The differential depth of spaced zones along the cable indicates the attitude of the cable, whether the cable is lying on the bottom, and if the cable is lying on the bottom gives information on the topography of the bottom.

The system of the invention utilizes a differential pressure device which is formed of two pressure transmitters arranged in spaced relation for transmitting pressure from two spaced points and the difference in pressure from the spaced points is converted in terms which are indicative of differential depth. The instrumentation for converting the signals comprises a transducer wherein the differential pressure is converted into electrical signal data and the electrical signal data is then converted by a signal data converter which is in series with the transducer to convert the electrical signal into differential depth. By using a plurality of assemblies of such differential pressure devices and the associated converter equipment, the differential pressures in a plurality of spaced zones can be transmitted and the differential depths in the several zones can be established. By providing a continuous array or interconnected group of such assemblies of the differential pressure devices and the converter equipment, which are electrically interconnected with each other and with read out equipment, the differential depths can be readily indicated or displayed when the array is located in a body of water. Consequently, when a cable is being layed by a vessel, the differential depth information of selected zones along the cable can be transmitted to the vessel for display by suitably attaching the continuous array to a length of the cable.

The particular pressure transmitters of the differential pressure device may each consist of diaphragm structure which provides a pressure fluid compartment and independent conduits which communicate between the diaphragm structure and the transducer for transmitting the pressure from each compartment to the transducer. The auxiliary transducer for converting the pressure data to electrical signals and the signal converter equipment is available commercially and appropriate circuitry for operating such equipment may be selected in accordance with the particular transducer and converter equipment being used.

The broad object of the invention is to provide a system for determining the differential depths existing along a plurality of spaced zones of an underwater cable.

Another object of the invention is to provide an array of instrumentation which is operative to provide differential depth information of a plurality of zones along an underwater cable.

Other objects, advantages and novel features of the invention will become apparent from the following detailed description of the invention when considered in conjunction with the accompanying drawings, wherein.

Figure 1:
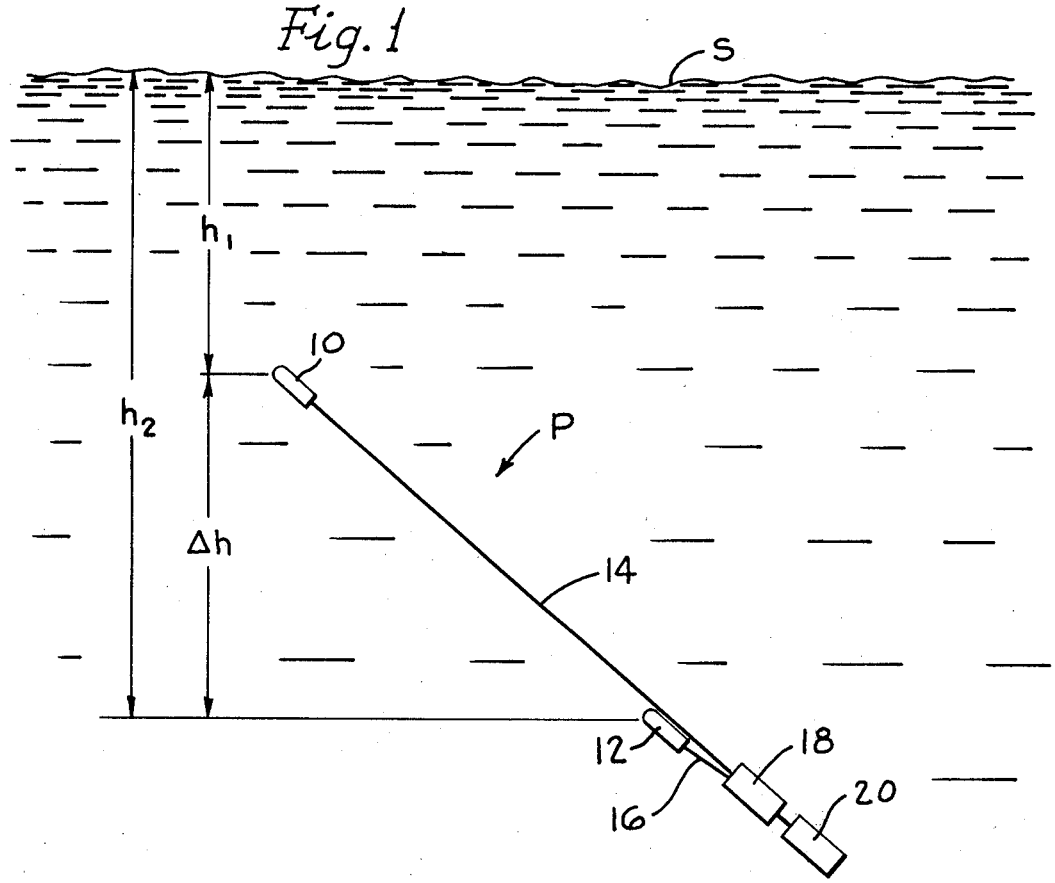
FIG. 1 is a diagrammatic view of the differential pressure device assembly of the invention.

The pressure device of FIG. 1 is indicated generally at P and is formed of flexible diaphragm housings 10 and 12 to provide pressure chambers which communicate respectively through suitable conduits 14 and 16 with a transducer 18. The housings 10 and 12 and the conduits 14 and 16 will contain a suitable pressure transmitting liquid such as an hydraulic oil which will transmit the pressures existing in the water surrounding the housings and the transducer 18 will be operative to convert the pressure difference into an electrical signal. The electrical signal is then transmitted to equipment 20 wherein differential depth information is obtained on the premise that with a known liquid density the differential depth is proportional to the differential pressure of the liquid.

The differential pressure measured by the device of FIG. 1 is proportional to the difference in density between the sea water and the transmitting fluid and for optimum operation of the pressure device, the transmitting fluid used should have a high density relative to that of the sea water and the transmitting fluid should also be such that the density difference remains substantially constant during use of the device. Use of such a transmitting fluid provides a sensitive device and tends to reduce errors which are unwanted. As shown in FIG. 1, the pressure of diaphragm housings 10 and 12 are disposed at different depths wherein $H_1$ indicates the depth of housing 10 below the water surface $S$, $h_2$ indicates the depth of housing 12 below the surface while $\Delta h$ indicates the difference in depth between pressure housings 10 and 12.

Figure 2:
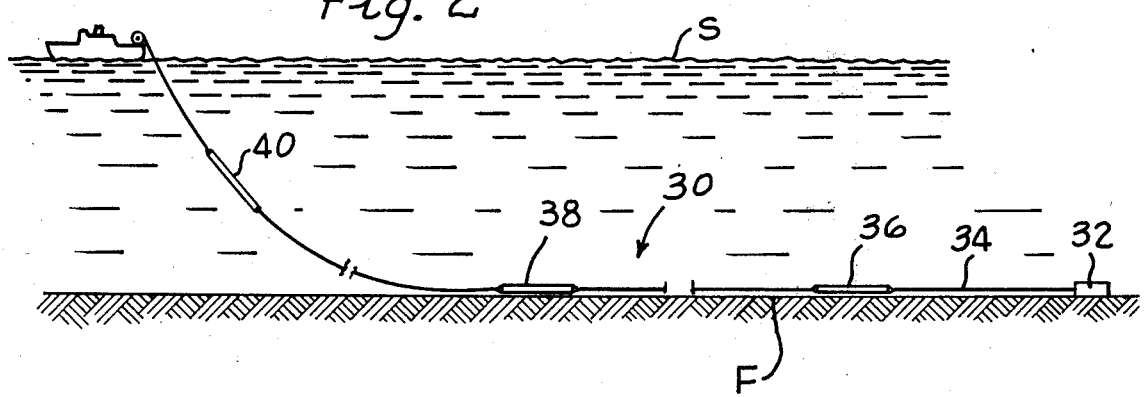
FIG. 2 is a schematic view of an array of a plurality of the assemblies of FIG. 1 arranged as a continuous unit for attachment to an underwater cable as it is being played out from a vessel.

In FIG. 2, the array of a plurality of the pressure device assemblies of FIG. 1 are interconnected as a unit indicated generally at 30 and located between a vessel on the ocean surface S and an anchor 32 reposing on the ocean floor which is indicated at F. The cable is not shown but during a cable laying procedure, the array unit 30 of FIG. 2 will be attached to the cable and suitable circuitry will be used to convey the differential depth information from the array to the vessel read out equipment. The structure of FIG. 2 may, for example, be a continuous flexible conduit 34 shaped generally as shown to receive the assemblies of the pressure device in the zones or areas indicated at 36, 38 and 40. It will be understood, although not shown, that the assemblies in the conduit at zones 36, 38 and 40 will be interconnected by circuitry with the read out equipment of the vessel.

Consider the length of the array of FIG. 2 to be approximately 2000 feet and that the differential assemblies at 36, 38 and 40 are spaced apart approximately 500 feet. When the array is attached to a cable as it is being layed, the instrumentation will provide the differential depth information between zones 36 and 38, between zones 38 and 40 and between the end zones 36 and 40. Such information can then be used to plot the position of the cable on the ocean floor F and to thus provide a general picture of the contour of the ocean floor.

Obviously many modifications and variations of the present invention are posssible in the light of the above teachings. It is therefore to be understood that, within the scope of the appended claims, the invention may be practiced otherwise than as specifically described.

I claim:

1. A system of instrumentation for determining differential depths existing at a plurality of spaced zones along an underwater cable which comprises, a. a unit formed of a pair of pressure transmitting devices located in spaced relation in each of said zones and operative by the surrounding water pressure, b. an independent transducer in communication with each of said pair of pressure transmitting devices and operative to develop a first signal in each zone which is indicative of differential pressure and c. an independent converter having a direct connection with each transducer which is operative to convert each first signal into a second signal which is indicative of differential depth whereby the difference in depths among the zones may be determined.

2. Apparatus as set forth in claim 1, further characterized by a conduit having a plurality of units formed of the pressure transmitting devices, the transducer and the converter in each unit enclosed therein and wherein said units are spaced distances which are determinative of the spacing between said zones.

3. Apparatus as set forth in claim 2, further characterized by said conduit being flexible and arranged to be payed out from a surface vessel in generally parallel relation with said underwater cable as it is being layed.

4. Apparatus as set forth in claim 1, further characterized by said pair of pressure transmitting devices comprising spaced housings containing a pressure transmitting fluid and each having an independent conduit in communication with the transducer.

5. Apparatus as set forth in claim 2, further characterized by the pressure transmitting fluid having a substantially greater density than the surrounding water.

* * * * *